Figure 1:
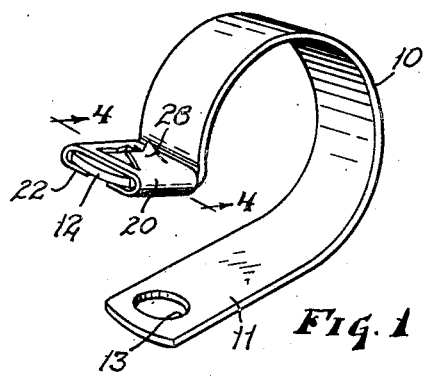

Aug. 14, 1945.   G. A. TINNERMAN   2,382,678
FASTENING DEVICE
Filed May 9, 1942   2 Sheets-Sheet 1

Inventor
George A. Tinnerman,
By Bates, Teare & McBean,
Attorneys.

Aug. 14, 1945.   G. A. TINNERMAN   2,382,678
FASTENING DEVICE
Filed May 9, 1942   2 Sheets-Sheet 2

Inventor
George A. Tinnerman,
By Bates, Teare & McBeau
Attorneys

Patented Aug. 14, 1945

2,382,678

UNITED STATES PATENT OFFICE 2,382,678

FASTENING DEVICE

George A. Tinnerman, Cleveland, Ohio, assignor to Tinnerman Products, Inc., Cleveland, Ohio, a corporation of Ohio Application May 9, 1942, Serial No. 442,335

1 Claim. (Cl. 248—74)

This invention relates to a fastening device adapted to embrace a conduit or pipe and be readily attachable to a support to position the conduit. One of the objects of the invention is to provide such a fastening device which may be cheaply constructed and attached in a very quick and simple manner, merely by the application of a screw passing through into the support, the fastening device itself forming a nut for the screw and avoiding the necessity for a wrench.

Various forms of the conduit clamp are illustrated in the drawings hereof and hereinafter described, all these forms being characterized by a loop which is adapted to extend about the conduit and having two projecting arms, one of which carries a clip having a pair of opposed spring tongues standing obliquely to the plane of the clip and adapted to provide diagonal struts engaging the thread of the applied screw, thus acting at once as a nut and a nut lock.

Each projecting arm of the loop has an opening for the passage of the screw and the space between the two tongues, which are notched and warped at their edges, registers in use with these openings so that the screw passes through both arms of the loop and between the two strut tongues of the clip. These tongues are notched at their edges and warped in opposite directions so that they bound a spiral space corresponding to the helix of the screw thread.

Other features of the invention above outlined will be apparent from the description of the embodiments hereinafter given.

Figure 3:
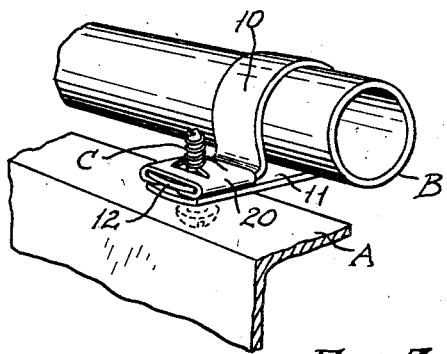
Figure 2:
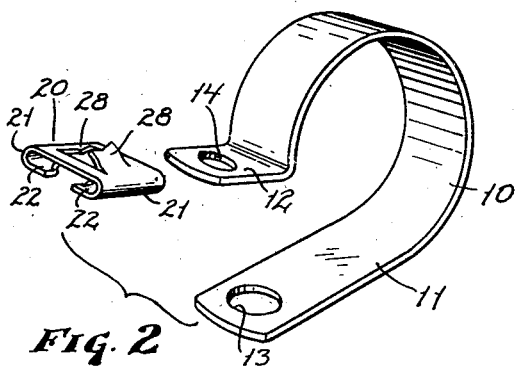
Figure 4:
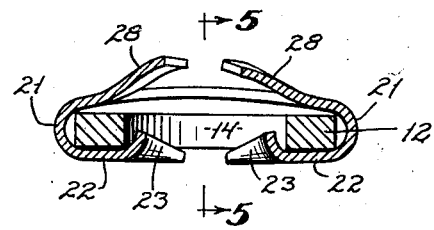
Figure 6:
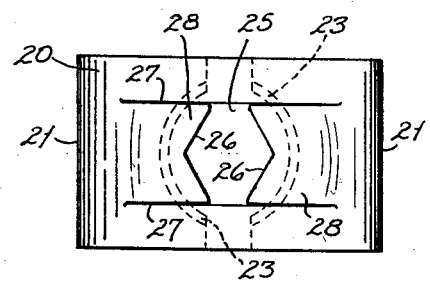
Figure 5:
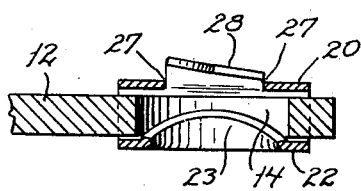
Figure 7:
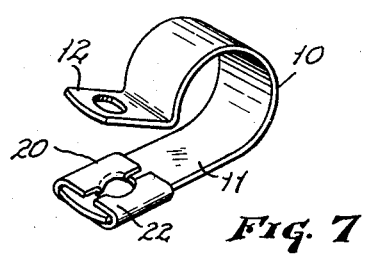
Figure 8:
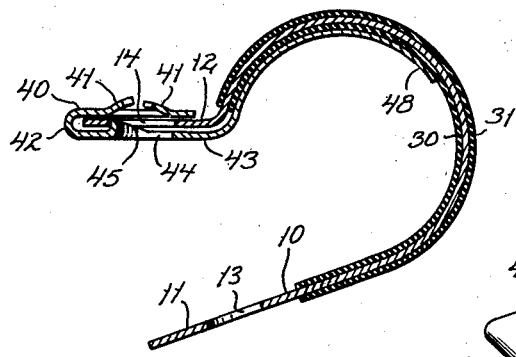
Figure 9:
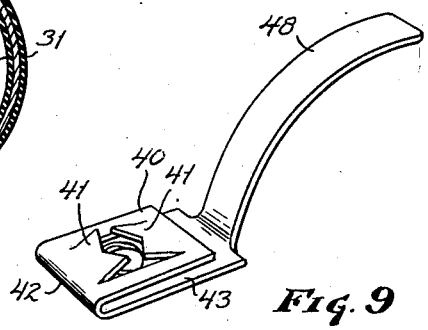
Figure 10:
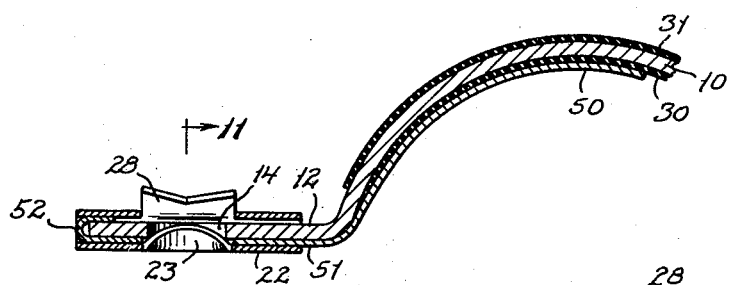
Figure 11:
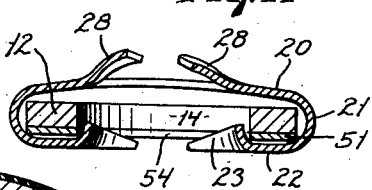
Figure 12:
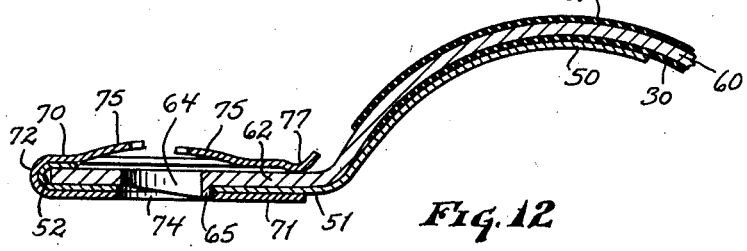
Figure 13:
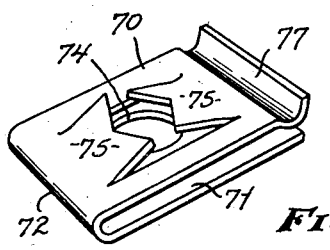

In the drawings, Fig. 1 is a perspective of one form of the fastening clamp in condition ready for application; Fig. 2 is a separated view of two parts of the clamp, shown assembled in Fig. 1; Fig. 3 is a perspective showing this form of clamp attached to a support and embracing a conduit; Fig. 4 is a cross section through the clamp in the plane indicated by the line 4—4 in Fig. 1, but on a larger scale; Fig. 5 is a cross section at right angles from Fig. 4, as indicated by the line 5—5 on Fig. 4; Fig. 6 is a plan of the fastening clip; Fig. 7 is a perspective of a clamp having the loop similar to Fig. 1 but with the fastening clip on the opposite leg; Fig. 8 is a perspective of a modified form of complete clamp in which the fastening clip has an arcuately extending tongue formed integrally with it and adapted to engage the conduit; Fig. 9 is a perspective of the clip and tongue of Fig. 8; Fig. 10 is a fragmentary section of another form of conduit clamp embodying my invention; Fig. 11 is a cross section in the plane indicated by the line 11—11 on Fig. 10; Fig. 12 is a fragmentary view of still another form of conduit clamp embodying my invention; Fig. 13 is a perspective of the fastening clip employed in the embodiment of Fig. 12.

Referring first to the embodiment of Figs. 1 to 6 inclusive, 10 indicates a strap or band, preferably of metal, looped on itself into an arcuate form for something over half of a complete circumference, and terminating in two extreme arms, one of which, designated 11, preferably leads tangentially from the curved portion of the strap, and the other of which, designated 12, diverges abruptly from the strap, at approximately right angles to the adjacent portion thereof. Round openings 13 and 14 are formed in these two arms. When the arms are brought together, or almost together, a substantially cylindrical space is confined by the strap and thus the strap when applied may snugly embrace a conduit or pipe. This is illustrated in Fig. 3 wherein A indicates a suitable support in the form of an angle bar or bracket and B the conduit.

In this embodiment, I apply a separate fastening clip to the short abrupt arm 12 to provide the nut desired. This clip is designated 20 and comprises a strip of metal doubled on itself in two intermediate regions designated 21 to provide two under portions 22 separated from each other and terminating in upturned edges 23, adapted to extend into the hole 14 of the clamp arm. In the upper face of the clip, I provide a central opening 25 bounded by V-shaped edges 26, and I form in the top of the clip two parallel slits 27. These slits and the central hole leave a pair of tongues 28 projecting toward each other from regions adjacent the folds of the clip. These tongues are bent up at an acute angle to the top plane of the clip and are warped in opposite directions, as shown in Fig. 2, and thus define one turn of a helix corresponding to the thread of the fastening screw to be used.

The clip described is shoved into place over the abrupt arm 12 of the loop 10, and whereupon the upturned edges 23, the tops of which are beveled upwardly toward the outer edge of the clip, slide along the underside of the arm and spring into the opening 14 in the arm, retaining the clip in place. This produces the structure illustrated in Fig. 1.

The clamp described after being placed about the conduit is attached to the support A merely by passing a screw C, Fig. 3, through the support A through the openings of the two arms and between the tongues 28, which constitute a nut for the thread of the screw. When the screw is put in place and tightened the upper arm of the loop is pulled down, bringing the under face of the clip into snug engagement with the lower arm and forcing it against the support, so that the clamp is firmly attached to the support.

The loop and conduit are of such relative size that this action clamps the conduit by the loop. The struts of the fastening clip not only form a nut but by their spring action engaging the threads of the screw form a lock for the screw, preventing its being jarred loose.

The embodiment of Fig. 7 is the same as that of Fig. 1 except that the clip 20 is applied to the tangential arm 11 of the loop instead of to the abrupt arm 12, and in such application the clip is turned the other side up, so that the oblique tongues are on the underside of the fastening device. This embodiment is particularly well adapted for use when the clip is attached to the under side of the support, and the fastening screw passes downwardly through the support and then through the fastening device and is retained by the spring tongues at the bottom.

The embodiments of Figs. 8 to 13 inclusive are for use where it is desired to have the clamp cushioned by yielding material such as rubber on its inner face. In such case it is desirable to have a metallic connection with the conduit so that it may be electrically grounded through the support, preventing accumulation of static electricity. To that end the fastening devices which I will now describe are provided with an arcuate metallic arm which contacts with the conduit.

Referring to the embodiment of Fig. 8, the clamping member 10 is the same as in Fig. 1 with the tangential leg 11 and the abrupt leg 12, except that the arcuate loop between these legs carries cushioning material. This may be a flattened tube of rubber or insulating material which may envelope the loop. The inner and outer layers of this envelope appear in Fig. 8 and are designated 30 and 31.

In the embodiment of Figs. 8 and 9, I form the clip of three integral connected portions, namely, a top member, a bottom member and an arcuate arm. The top member 40 has an opening and parallel slits to provide two tongues 41 bent up at an oblique angle, and warped, as in Fig. 1. This top member is bent over at the end 42 and continues as a parallel bottom member 43 having an opening 44 with an upturned flange having an inclined top 45. At its inner edge the bottom member continues as a narrowed arcuate portion 46 extending for something less than a semi-circumference. The upstanding flange 45 is formed about the half of the hole 44 which is on the side toward the bend 42. This gives an abrupt shoulder adjacent the bend with an incline gradually leading to the shoulder.

When the parts in Fig. 8 are being assembled, the abrupt arm 12 of the clamp is shoved into the opening between the two layers 40 and 43 of the clip in a direction toward the bend 42. This enables the extreme end of the clamp arm to slide up on the inclined top of the lug 45, spring over that top, the lug thus entering the hole 14 of the clamp arm, thereby retaining the clip on the clamp, with the arcuate arm 46 of the clip lying snugly against the inner layer 30 of the yielding covering.

The clamp of Fig. 8 is applied to the conduit in the same manner as the clamp of Figs. 1 to 6, the conduit being embraced by the clamp and the retaining screw passing through the opening 13 of the tangential arm 11 and thence through the opening 44 of the clip, thence the opening 14 of the clamp and finally receiving its nut by the inclined struts 41. When so applied the arcuate tongue 46 contacts tightly with the surface of the conduit and thus serves to ground the same to the frame carrying the support.

In Figs. 10 and 11, a modified form of automatically grounding fastening device is shown. Here the arcuate metallic member is separate from the clip but is retained by the clip against the clamping member. In this embodiment, the clamping member itself is the same as in Fig. 8 having the loop 10 of the abrupt arm 12 with the opening 14 and the inner and outer elastic layers 30 and 31. The ground member comprises an arcuate strip 50 having a flat arm 51 adapted to lie snugly against the under face of the arm 12 and provided at its end with a turned over portion 52 so that it may engage the upper face of the arm 12. The flat portion 51 has an opening at least as great as the opening 14 with which it registers.

The clip 20 in this embodiment of Figs. 10 and 11 is identical with that of Figs. 1 to 6, having the top plate, the raised oblique tongues 28, the bent over edges 21, the bottom portion 22 and the upturned lips 23 with inclined tops. When such clip is shoved into place over the end of the arm 12, against which the grounding strip is mounted, the inclined lips 23 slide under the grounding strip and spring back into place through the opening 54 of that strip into the opening 14 of the arm 12, as shown particularly in Fig. 11.

Figs. 12 and 13 illustrate still another embodiment of a grounded clamp having a clip applied thereto. In these embodiments the looping portion 60 of the clamp has a specially formed abrupt arm 62 provided not only with the hole 64 but with a depending flange 65 about the hole which is cut away on an incline on the underside. The incline is greatest in the region of the flange nearest the arcuate arm, merging with the bottom plane of the flat arm 62 adjacent the point of the hole 64 farthest from the arcuate arm.

The arcuate arm carries the inner and outer layers 30 and 31 of yielding material similar to the forms of Figs. 8 and 10. The grounding arm is the same as that of Fig. 10, comprising the arcuate portion 50 lying against the inner member layer 31 and the flat arm 51 and the bent over end portion 52 which comes onto the top of the clamp arm 62.

The retaining clip of the embodiment of Figs. 12 and 13 is somewhat different from that shown in any of the other figures. It comprises the top plate 70, the bottom plate 71 integrally connected by a bent over end 72. The bottom plate has a round hole 74 through it. The top plate is formed with a hexagonal hole and a pair of parallel slits producing two tongues 75 with V-shaped ends which were bent up obliquely and oppositely warped, as in various other embodiments. The free end of the top plate of this clip is bent first downwardly and then upwardly to produce a beaded edge adapted to have a spring engagement with the clamp arm.

In the assembled parts shown in Figs. 12 and 13, the grounding strip is first hooked over the end of the clamp arm 62 and brought tightly against the inner face of the clamp so that the arcuate lug 65 extends through the opening of the grounding strip and beyond it. Then the clip is shoved lengthwise of itself over the end of the clamp arm and grounding strip. In this operation the lower arm 71 of the clip is cammed downwardly by the incline 65 and then springs up into place beyond it, snugly engaging the under face of the arm 51 of the grounding member. At the same time the bead extension 77 on the end of the upper arm of the clip bears down snugly on the upper face of the clamp arm 62. The parts are thus firmly retained in mutual position.

It will be seen that in all the different embodiments in my invention I have provided a loop adapted to embrace a conduit or pipe, the loop having two projecting arms with openings through them, and I have mounted on one of these arms a screw retainer in the form of a clip embracing the arm and retained in place by inter-engaging shoulders on the clip and arm. In each case one face of this clip is formed with opening for the passage of the screw and the other face with a pair of opposed inclined warped tongues having V-shaped notches such distance apart as to snugly engage in the thread with a screw passed through the openings in the arms. The inter-engaging shoulders mentioned are provided by an opening in the clamp arm or in the clip and a flange with an inclined face on the other member, so that the clip may be slid onto the clamp arm and when located will spring into place, the inclined flange of one of the members occupying the hole of the other. The loop is thus provided with a retaining device which provides for the passage of the fastening screw and provides oblique spring tongues acting as the nut for that screw.

It will be understood from the description given that the clip of this invention may be very quickly mounted on the clamp arm and is readily adapted for use on present manufactures of clamping loops. When the loop is so equipped it provides for the clamping of the conduit with the maximum speed. Separate nuts and wrenches therefore are avoided, the only tool necessary being a screw driver. Moreover, the spring action of the clip tongues locks the screw effectively in place so that no nut lock is necessary.

Reference is made to my divisional application Serial No. 465,557, filed November 14, 1942, for claims on the fastening device having a cushioning lining and a grounding arcuate arm on the inner face thereof, as illustrated in the second sheet of drawings hereof. Also to my divisional application Serial No. 476,219, filed February 17, 1943, for claims on the clip itself, shown herein in Figs. 1–7, 10 and 11.

I claim:

A fastening device comprising a loop with projecting arms having openings for the passage of a bolt and a nut detachably mounted on one of said arms, said nut comprising a clip formed of a strip of resilient sheet material doubled on itself by two return bends to provide an intermediate portion and two extreme portions substantially parallel with the intermediate portion and spaced therefrom and being formed with recesses in their ends, said clip embracing one of said arms, one of the extreme portions being deformed to engage the wall of the opening in said arm.

GEORGE A. TINNERMAN.